(12) United States Patent
Kalil et al.

(10) Patent No.: US 11,599,015 B2
(45) Date of Patent: Mar. 7, 2023

(54) AWNING PROJECTOR SYSTEM

(71) Applicants: Jake Kalil, Colonie, NY (US); Peter Kalil, Schenectady, NY (US)

(72) Inventors: Jake Kalil, Colonie, NY (US); Peter Kalil, Schenectady, NY (US)

(*) Notice: Subject to any disclaimer, the term of this patent is extended or adjusted under 35 U.S.C. 154(b) by 265 days.

(21) Appl. No.: 16/808,754

(22) Filed: Mar. 4, 2020

(65) Prior Publication Data

US 2021/0278758 A1  Sep. 9, 2021

(51) Int. Cl.
| | |
|---|---|
| *G03B 21/58* | (2014.01) |
| *H04N 9/31* | (2006.01) |
| *G03B 21/14* | (2006.01) |
| *B60R 11/02* | (2006.01) |
| *B60P 3/36* | (2006.01) |
| *B60R 11/00* | (2006.01) |

(52) U.S. Cl.
CPC ............... *G03B 21/58* (2013.01); *B60P 3/36* (2013.01); *B60R 11/0229* (2013.01); *G03B 21/14* (2013.01); *H04N 9/3173* (2013.01); *B60R 2011/0043* (2013.01)

(58) Field of Classification Search
None
See application file for complete search history.

(56) References Cited

U.S. PATENT DOCUMENTS

| | | |
|---|---|---|
| 2005/0039861 A1 | 2/2005 | Faludy et al. |
| 2009/0239393 A1 | 9/2009 | Shah et al. |
| 2011/0304823 A1 | 12/2011 | Wensing et al. |
| 2015/0330087 A1 | 11/2015 | Taylor et al. |
| 2018/0291633 A1* | 10/2018 | Thompson .......... E04F 10/0625 |
| 2019/0166427 A1* | 5/2019 | Mathiasen ................ H04S 3/00 |

OTHER PUBLICATIONS

PCT International Search Report & Written Opinion dated Jul. 27, 2021 corresponding to PCT International Application No. PCT/US2021/020807.

* cited by examiner

*Primary Examiner* — Bao-Luan Q Le
*Assistant Examiner* — Danell L Owens
(74) *Attorney, Agent, or Firm* — Schmeiser, Olsen & Watts, LLP

(57) ABSTRACT

A projector system including an awning bar having an awning bar body having a length extending between a first end and a second end. The projector system includes a projector having a projection lens. The projector is attachable to the awning bar along the length. The awning bar is configured to attach to a portion of an awning canopy such that the projection lens is located below the awning canopy when the awning canopy is in an open position.

18 Claims, 8 Drawing Sheets

AWNING PROJECTOR SYSTEM

TECHNICAL FIELD

The technical field relates to projector systems. Specifically, the technical field relates to a projector system integrated, attached or otherwise connected to an awning system.

BACKGROUND

People enjoy consuming media such as music and film outside when weather permits. Drive-In theaters provide an open-air environment where patrons can watch a movie from the comfort of their vehicle. People often use portable speakers to listen to music outdoors when spending time with friends and family. Outdoor recreation is often a reason why people use outdoor living spaces or recreational vehicles, commonly referred to as "RV's" such as motor homes and campers. Outdoor living spaces and RV's often have awnings that provide shade and protection from rain and other weather elements when users are spending time outdoors. Some outdoor living spaces and RV's have television stands so that a television can be set up and viewed by users outdoors. However, current outdoor television set-ups limit users' viewing experience to small screen sizes. This small screen size can reduce viewing quality of the content a user wishes to see, and can make it difficult for a whole family or group of friends to view content outside because everyone must try to position themselves in cramped proximity to a small screen to be able to see. An awning projector system would be well-received in the art.

SUMMARY

According to one aspect, a projector system comprises an awning bar including an awning bar body, the awning bar body having a length extending between a first end and a second end; and a projector including a projection lens, wherein the projector is attachable to the awning bar along the length, wherein the awning bar is configured to attach to a portion of an awning canopy such that the projection lens is located below the awning canopy when the awning canopy is in an open position.

According to another aspect, a projector system comprises a retractable awning assembly including an awning bar including an awning bar body, the awning bar body having a length extending between a first and second end, wherein the awning bar is configured to attach to a portion of an awning canopy; and at least one arm attachable to the awning bar, wherein the at least one arm is configured to move the awning bar away from a vertical wall and move the awning bar toward the vertical wall such that in a first awning bar position, the awning bar is extended away from the vertical wall and the canopy is in an open position and extending between the first awning bar and vertical wall, and such that in a second awning bar position, the awning bar is retracted to the vertical wall and the canopy is in a closed position; and a projector including a projection lens, wherein the projector is attachable to the awning bar between the first end and the second end such that in the first awning bar position, the projector is configured to project light towards the vertical wall below the awning canopy.

According to one aspect, a projector system comprises a recreational vehicle having at least one vertical outer wall; a retractable awning assembly including an awning bar, including an awning bar body, the awning bar body having a length extending between a first end and a second end, wherein the awning bar is configured to attach to a portion of an awning canopy such that the portion of the awning canopy is attachable to the awning bar body along the first length; and at least one arm attachable to the awning bar, wherein the at least one arm is configured to move the awning bar away from the at least one vertical outer wall and move the awning bar toward the at least one vertical outer wall such that in a first awning bar position, the awning bar is extended away from the at least one vertical outer wall and the canopy is in an open position and extending between the awning bar and at least one vertical outer wall, and such that in a second awning bar position, the awning bar is retracted to the at least one vertical outer wall and the canopy is in a closed position; and a projector including a projection lens, wherein the projector is attachable to the awning bar between the first end and the second end such that in the first awning bar position, the projection is configured to project light towards the at least one vertical outer wall underneath the awning canopy.

DESCRIPTION

A detailed description of the hereinafter-described embodiments of the disclosed apparatus and method are presented herein by way of exemplification and not limitation with reference made to the Figures. Although certain embodiments are shown and described in detail, it should be understood that various changes and modifications might be made without departing from the scope of the appended claims. The scope of the present disclosure will in no way be limited to the number of constituting components, the materials thereof, the shapes thereof, colors thereof, the relative arrangement thereof, etc., and are disclosed simply as an example of embodiments of the present disclosure. A more complete understanding of the present embodiments and advantages thereof may be acquired by referring to the following description taken in conjunction with the accompanying drawings, in which like reference numbers indicate like features.

Figure 1:
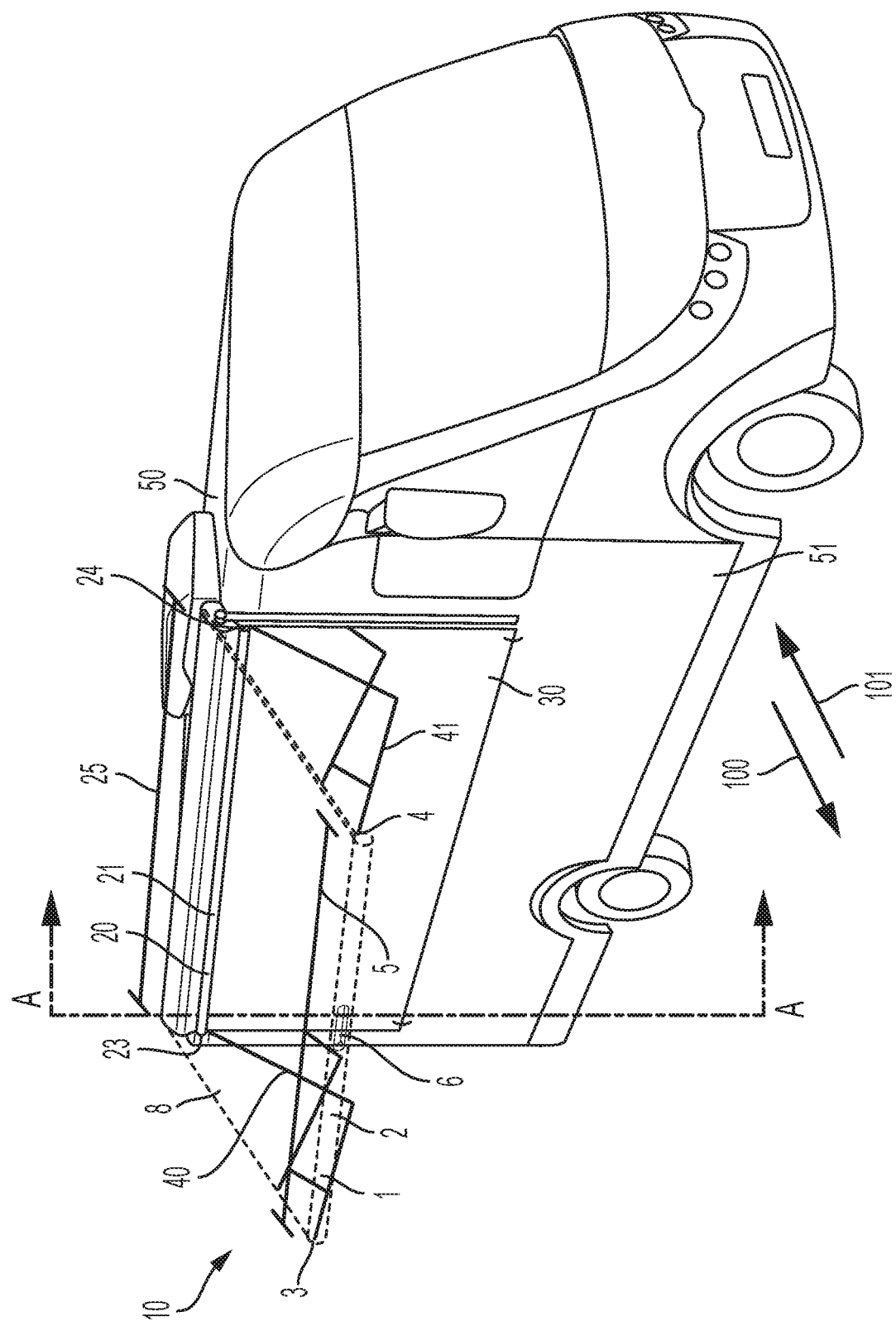
FIG. 1 depicts a perspective view of a projector system according to one embodiment.

With reference to FIG. 1, a perspective view of a projector system 10 according to one embodiment is shown. The projector system includes an awning bar 1. The awning bar includes an awning bar body 2 that has a first end 3 and a second end 4, and a length 5 extending between the first end 3 and the second end 4. The projector system 10 also includes a projector 6, which has a projection lens 7 (not shown). The projector 6 is attachable to the awning bar 2 along the length 5. The awning bar 1 is configured to attach to a portion of an awning canopy 8 such that the portion of the awning canopy 8 is attachable to the awning bar body 2 along the length such that the projection lens 7 is located below the awning canopy 8 when the awning canopy 8 is in an open position as shown in FIG. 1. The awning canopy 8 and awning bar 1 are shown with dotted lines in FIG. 1 to show the location of these elements and permit other elements such as the projector 6 to be seen "through" the elements shown in dotted lines.

The projector 6 may be attachable to the awning bar 1 by clamps, straps, screws, nails, fasteners, ridges, and the like. The projector 6 may be configured to attached to the awning bar 1 when the awning bar 1 is in a first awning bar position the extended away from the vertical wall 51. The projector 6 may include one or more tabs configured to lay against the awning bar 1 and may further include holes configured to align with matching holes along the length 5 of the awning bar 1 such that the projector 6 may be attached to the awning bar by aligning the holes of the tabs with the holes in the awning bar and screwing screws into the corresponding holes such that the projector 6 is affixed to the awning bar 1. In one embodiment, the awning bar 1 may have a series of equidistant holes along the length 5 of the awning bar body 2 such that the placement of the projector 6 can be customized to one or more locations along the awning bar 1. The projector 6 may be a standard projector, a portable projector, and the like. The projector 6 is not limited to having the shape or dimensions shown in the embodiments in the Figures. For example, the projector 6 may have a cube shape, a cylinder shape, and the like. The projector 6 may be configured to connect with a smart phone, laptop, tablet, or other mobile device and project images or videos from a mobile device. The projector 6 may connect with a mobile device by a wireless connection such as WiFi or Bluetooth®. The projector may connect with a mobile device by physical attachment with the mobile device.

Figure 2:
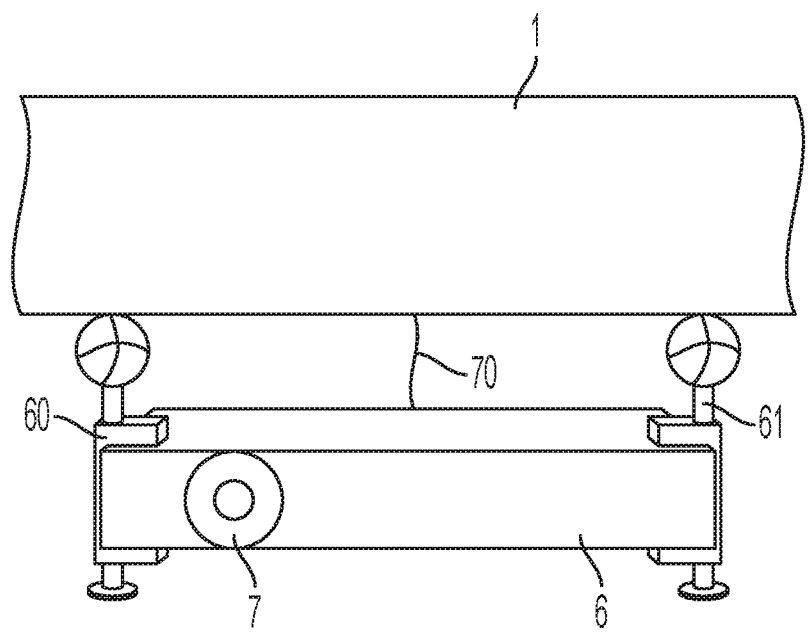
FIG. 2 depicts a cut-off perspective view of an awning bar of a projection system according to one embodiment.

In another embodiment, the projector 6 may be attachable to the awning bar by one or more clamps. For example, with reference to FIG. 2, a cut-off perspective view of an awning bar 1 of a projector system is shown according to one embodiment. The awning bar 1 may include a first clamp 60 and a second clamp 61. The first and second clamps 60, 61, may be adjustable such that any dimension projector 6 could be held by the first and second clamps 60, 61. The first and second clamps 60, 61 may be adjustable in position along the length 5 of the awning bar 1, such as by a track extending along the length 5. The first and second clamps 60, 61 may be securably adjusted to various distances away from one another to accommodate differently sized projectors. The first and second clamps 60, 61 may each include a ball and socket joint to allow securable adjustment of the position of the projector 6, for example, to adjust the angle of projection through the projector lens 7. The projector 6 is not limited to being attached to the awning bar by a first and a second clamp 60, 61, and may be attached to the awning bar by a single clamp. The projector 6 may be attached by more than two clamps.

In another embodiment, the projector 6 may be attachable to the awning bar 1 by a single clamp or more than two clamps. Wiring 70 used for operation of the projector 6 may be configured to insert into the awning bar 1, and may connect or interface with existing wiring within the awning bar 1, such as wiring for a motor used for automatic extension and retracting of the awning bar 1. The projector 6 is not limited to powering by wiring 70, for example, the projector 6 may be configured to interface with a power supply provided by electrical components of the awning bar 1 such as a power track. For example, the awning bar 1 may include a power track along the length 5. The awning bar 1 may include a power strip. The projector 6 may be battery operated. The projector 6 may be rechargeable, such as by charging, such as by a pluggable charger, by wireless charging, by manual charging such as by a hand crank, by solar power, and the like. The projector 6 may be powered by a lead cord plugged into an outside wall, inside wall, outside of a recreational vehicle, inside of a recreational vehicle, a generator, and the like.

Figure 3:
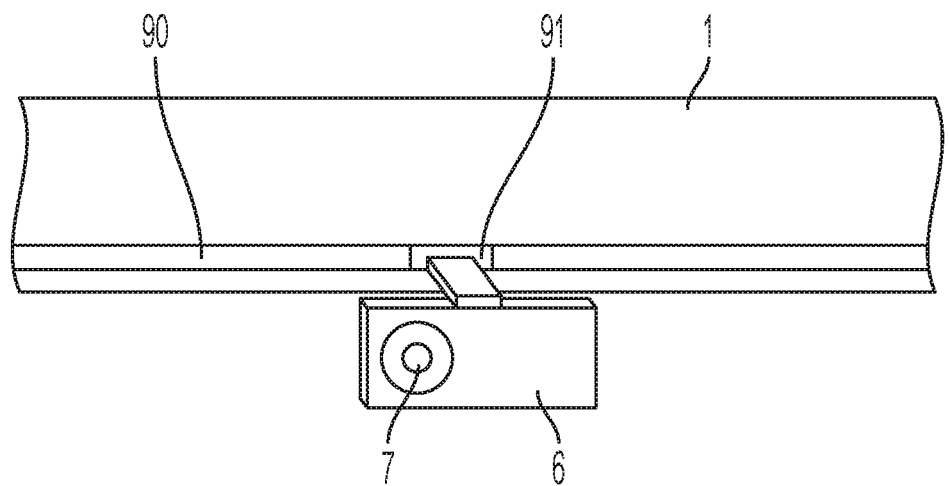
FIG. 3 depicts a cut-off perspective view of an awning bar of a projection system according to one embodiment.

With reference to FIG. 3, in another embodiment, the projector 6 may be attachable to the awning bar 1 by being insertable into a ridge of the awning bar 1. FIG. 3 shows a cut-off perspective view of an awning bar 1 of a projector system according to one embodiment. The awning bar 1 includes a ridge 90 extending along the length 5 of the awning bar, and the projector 6 includes a protrusion 91 extending from the projector 6 that is configured to be inserted into the ridge 90. For example, the protrusion may be a bar, flange, lip, a knob, a projection, and the like. As an example, the projector 6 may include a rotatable protrusion 91 that is configured to be inserted into the ridge 90 and then be rotated such that the protrusion 91 is securably arranged within the ridge 90. For example the protrusion 91 may have a width equal to or less than a width of an opening of the ridge 90, and the ridge 90 may comprise an inner portion within the awning bar 1 that accommodates the protrusion 91 when the protrusion 91 is rotated 90 degrees, such that the protrusion 90 is secured within the inner portion of the ridge 90 within the awning bar. The ridge 90 may be a track, a lipped opening, and the like. The ridge 90 may include a power track configured to supply power to the projector 6 when the protrusion 91 is inserted into the ridge 90. For example, power may be supplied to the projector upon contact of the protrusion 91 with the ridge 90.

Figure 4:
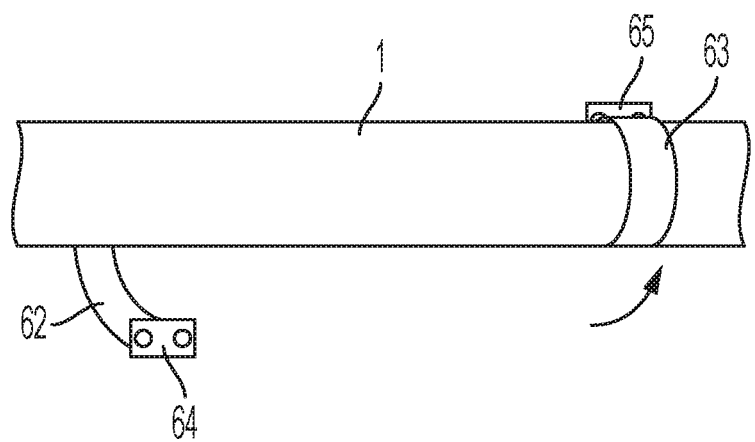
FIG. 4 depicts a cut-off perspective view of an awning bar of a projection system according to one embodiment

In yet another embodiment, the projector 6 may be attachable to the awning bar 1 by one or more moveable brackets. With reference to FIG. 4, a cut-off perspective view of an awning bar 1 of a projector system is shown according to one embodiment. The awning bar 1 in this embodiment includes a first moveable bracket 62 and a second moveable bracket 63. The first and second moveable brackets 62, 63 are hingedly moveable to be extended downward from the awning bar 1 as shown with respect to the first moveable bracket 62, or extended upward to the awning bar 1 as shown with respect to the second moveable bracket 63 such that the first and second moveable brackets can be secured against and confirm to the surface of the awning bar 1 when not in use. In this way, the canopy 8 can be rolled up around the awning bar 1 without being obstructed by the first and second moveable brackets. The first and second moveable brackets 62, 63 may each include a tab 64, 65 having one or more holes configured to align with holes in the outer surface of a projector 6, such that the first and second moveable brackets 62, 63 may be secured to the projector 6 such as by screws, bolts, and the like. In another embodiment, the tabs 64, 65 may be configured to insert into corresponding ridges on the projector 6, such as on the back of the projector 6. The projector 6 may be configured to attach to the awning bar 1 by more than one type of attachment interface, such as by clamps 60, 61, brackets 62, 63, and by a ridge 90 in the awning bar 1.

Figure 5:
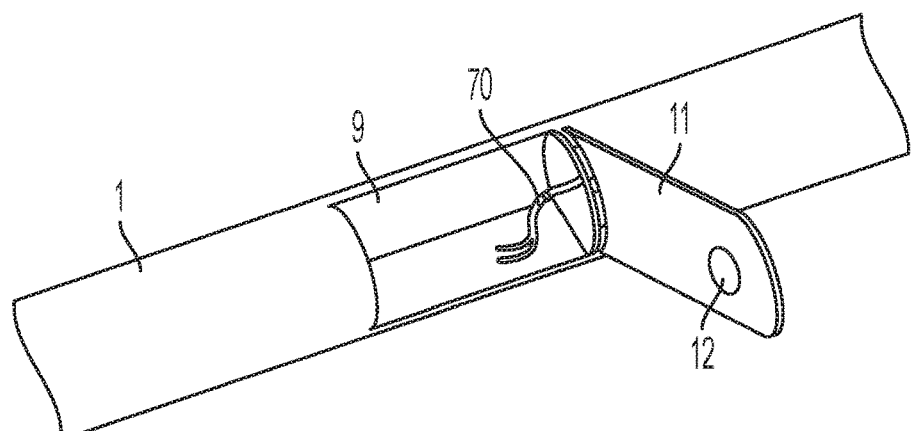
FIG. 5 depicts a cut-off perspective view of an awning bar of a projection system according to one embodiment.
Figure 6:
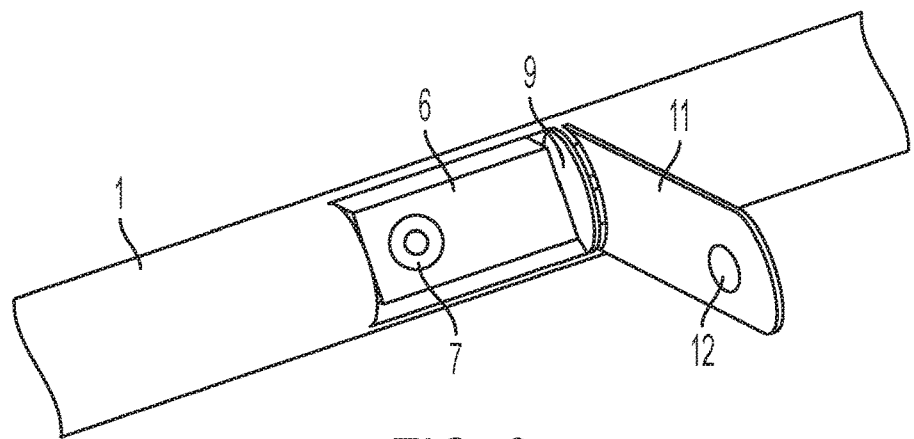
FIG. 6 depicts a cut-off perspective view of the awning bar of the projection system of FIG. 4 according to one embodiment.
Figure 7:
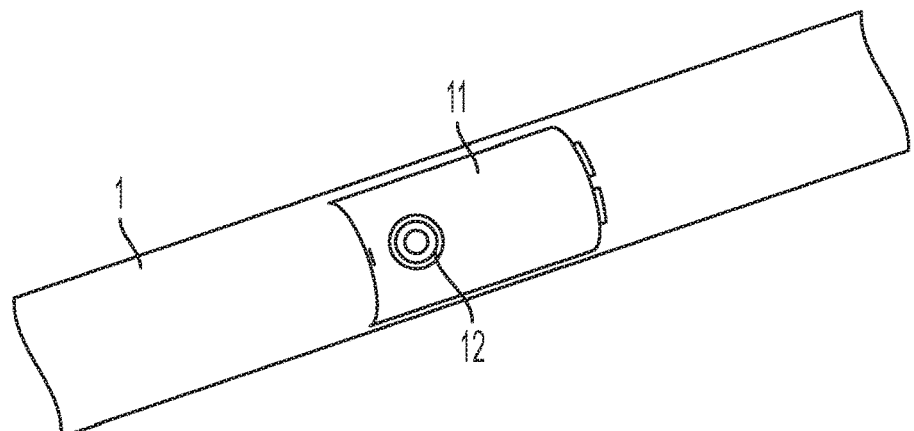
FIG. 7 depicts a cut-off perspective view of the awning bar of the projection system of FIGS. 4-5 according to one embodiment.

The projector 6 may be attachable to the awning bar 1 by being inserted into the awning bar. With reference to FIGS. 4, 5, and 6, a cut-off perspective view of an awning bar of a projection system according to embodiments is shown. The awning bar 1 may be a tube, such as a roller tube, hollow tube, hollow cylinder and the like having an opening 9 that extends between the first end 3 and the second end 4, and the projector 6 is attachable to the awning bar 1 within the opening 9, such as by inserting the projector 6 into the opening 9 as shown in FIG. 6. The opening 9 may include a compartment configured to contain the projector 6 such that the projector 6 is secured in position within the awning bar 1 opening 9 and cannot move left or right within the opening 9. In another embodiment, the opening 9 may include one or more tabs, stops, barriers, ridges, walls, protrusions and the like configured to contain the projector 6 to a secured position within the opening 9. Wiring 70, such as a power cord, used for the operation of the projector 6 may be fed through the opening 9 to the projector 6.

The opening 9 may be cylindrical in shape and may include a flat platform on which the projector 6 may be arranged. In this embodiment, the flat platform may include an adhesive such as hook and loop fasteners, or slide-reducing material such as rubber or silicon to attach the projector 6 or prevent the projector 6 from moving on the flat platform.

Figure 8:
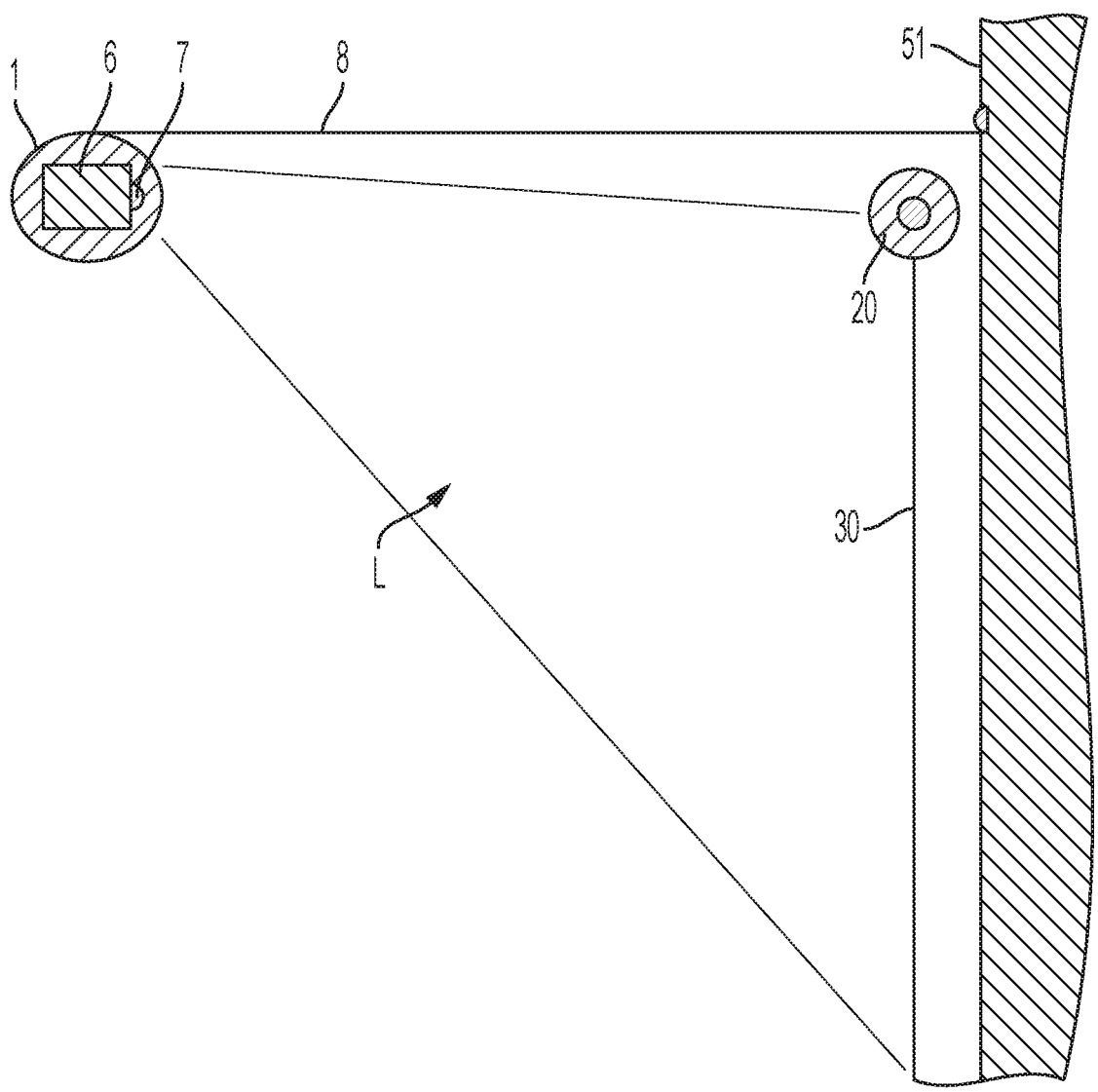
FIG. 8 depicts a cross-sectional view of the projection system of FIG. 1 taken along line A-A according to one embodiment.

The awning bar 1 may include a door 11 that can be opened, as shown in FIGS. 5 and 6, to place a projector 6 within the opening 9 and closable to contain the projector 6 within the opening 9, as shown in FIG. 8. The door 11 may be openable and closable such as by hinges, or by sliding back and forth or up and down, for example, on one or more tracks. The door 11 may comprise a portion of the surface of the awning bar body 2. The opening 9 may include a waterproof or moisture proof casing configured to contain the projector 6 and prevent moisture from contacting the projector 6 such that moist environments do not interfere with the operation of the projector 6. The door 11 may include a hole 12 configured to align with the projector lens 7 when the door 11 is in a closed position such that the projector 6 is able to project light through the hold 12. The hole 12 may include a transparent plastic, glass, or other material that is waterproof or moisture proof. The hole 12 may include a scratch-proof material, a smudge-proof material, and the like.

With continuing reference to FIG. 1, the awning bar 1 is extendable away from a vertical wall 51, such as an outside wall of a recreational vehicle 50. The vertical wall 51 is not limited to being an outer wall of a recreational vehicle 50, and may be a wall of a building such as a house, shed, garage, trailer, and the like. The vertical wall 51 may be a fence such as a landscaping fence. Recreational vehicle 50 may be a motorhome, a camper, a hauler, a travel trailer, a teardrop camper, a pop-up camper, and the like.

The awning bar 1 is extendable such that in a first position, shown in FIG. 1, the awning bar 1 is extended away from the vertical wall 51 and the canopy 8 is in an open position, and in a second position, the awning bar 1 is retracted to the vertical wall 51 and the canopy 8 is in a closed position. The projector 6 is attachable to the awning bar 1 such that in the first position, the projector 6 is configured to project light towards and onto the vertical wall 51. The awning bar 1 may be configured to extend in direction 100 to the first position, and retract in direction 101 to the second position. In this embodiment, the projector system 10 is attachable to a recreational vehicle 50 on an outer wall 51 of the recreational vehicle 50. The projector system may be attached to an outer wall by screws, bolts, fasteners, nails, rails, and the like. In this embodiment, the awning bar 1 is made of a rigid material, and may be made of metal, plastic, composite material, and the like.

The awning bar 1 may be extendable and retractable by manually pulling the awning bar, such as by a tab, cord, string, handle, and the like in direction 100. In a manual configuration, the awning bar 1 may be retractable in direction 101 by a spring arranged within the awning bar, a manually operable drive head located at the first end 3 or second end 4, and the like. The awning bar 1 may be extendable and retractable by a motor, such as a powered motor located in a drive head at the first end 3 or second end 4. In this embodiment, power may be drawn from a building or recreational vehicle to power the automatic extension and retraction of the awning bar. For example, wiring to power an automatic retractable awning bar may extend from the recreational vehicle to the awning bar 1, and a control panel may be located on the recreational vehicle 50, such as inside the recreational vehicle 50 on an interior wall, or on an outside wall such as vertical wall 51. Wiring may be arranged within a drive head motor casing, and extend along or within at least one moveable arm configured to extend and retract the awning bar 1 from a first awning bar position to a second awning bar position. For example, the projector system may include a first moveable arm 40 and a second moveable arm 41 that are configured to extend and retract the awning bar 1 away from and towards the vertical wall 51. In some embodiments, the projector system 10 may include a single moveable arm, such as one of the first moveable arm 40 and the second moveable arm 41. The projector 6 may be configured to connect or interface with wiring 70 of an automatic or powered awning bar 1. In another embodiment, any wiring 70 of the projector 6 may be configured to be arranged along the length 5 of the awning bar 1 for example, along the outside of the awning bar 1, or within the awning bar 1. Wiring 70 of the projector 6 may also extend along or within at least one movable arm, to the recreational vehicle 50 or other power source. For example, wiring 70 of the projector 6 may be arranged along the length 5 of the awning bar 1 and along or within at least one movable arm such that the wiring 70 is not visibly hanging or protruding from the awning bar 1, at least one movable arm, and the recreational vehicle 50 or other power source.

In an embodiment, the projector system 10 may include a retractable awning assembly that comprises the first awning bar 1 and at least one arm, such as the first moveable arm 40 and second moveable arm 41. The retractable awning assembly may include the canopy 8. The canopy 8 and first and second moveable arms 40, 41 are attachable to the vertical wall 51, such as by screw, nail, clamp, hook, hole, bore, and the like. The canopy 8 may be attachable to the vertical wall 51 by a rail including a ridge, and the canopy 8 may include a cord configured to be slid into the ridge such that the canopy 8 is secured to the rail. The canopy 8 may be attachable to the awning bar 1 by a ridge along the length 5 of the awning bar 1. For example, the canopy may have a second cord configured to be slid into the ridge of the awning bar 1 such that the canopy 8 is attached to the awning bar 1. In yet another embodiment, the projector system may include a recreational vehicle 50 having a vertical outer wall such as vertical wall 51.

In this embodiment, in the second awning bar position, the canopy 8 may be rolled around the awning bar 1. As the awning bar 1 extends away from the vertical wall 51 in direction 100, the awning bar 1 is configured to rotate such that the canopy 8 unrolls to an open position, in the first awning bar position. The awning bar 1 may rotate by a spring, drive head, motor, and the like. As the awning bar 1 retracts towards the vertical wall 51, the awning bar 1 may rotate in the opposite direction such that the canopy 8 rolls around the awning bar 1. For example, the awning bar 1 may be a tube such as a roller tube, a hollow tube, a hollow cylinder, and the like. The projector 6 and awning bar 1 may be configured such that the projector 6 rotates within an opening 9 of the awning bar 1 as the awning bar 1 rotates during extension and retraction of the awning bar 1 in direction 100 and direction 101. The projector 6 may be arranged in the opening 9 of the awning bar 1 such that when the awning bar 1 is fully extended the projector 6 is positioned within the awning bar 1 opening 9 such that the projector 6 is positioned such that light projected from the projector 6 is projected onto a projector screen 30 or vertical wall 51.

Referring back to FIG. 1, in an embodiment, the projector system includes a second awning bar 20 including a second awning bar body 21 having a first end 23 and a second end 24, and a length 25 extending between the first end 23 and the second end 24. The second awning bar 20 includes a projector screen 30. The projector screen 30 is attachable to the second awning bar 20 along the length 25 of the second awning bar 20. For example, the projector screen 30 may include a cord along an end of the projector screen that is configured to slide into a ridge along the length 25 of the second awning bar body 21. The second awning bar 20 may be rotatable such that in a first projector screen position, the projector screen 30 is unrolled and the projector screen 30 extends from the second awning bar 20 along a portion of the vertical wall 51 such that the projector 6 is configured to project light onto the projector screen 30 when the awning bar 1 is in the first awning bar position, and wherein in a second projector screen position of the projector screen, the projector screen 30 is rolled around the second awning bar 20. The awning bar 1 and second awning bar 20 may be controllable independently of one another such that the awning bar 1 is moveable when the projector screen 30 is extended and when the projector screen 30 is not extended. One or more of the vertical wall 51 and projector screen may include hooks, connectors, magnets, fasteners, and the like configured to secure to the end of the projector screen 30 to the vertical wall 51 such that the projector screen 30 is securable in the first projector screen position along the vertical wall 51. In another embodiment, the bottom corners of the projector screen 30 may each include a weight or weighted material such that the projector screen 30 hangs down smoothly when in the first projector screen position, extended along the vertical wall 51. In another embodiment, the projector system 10 may not include a projector screen 30 or second awning bar 20. For example, the projector system 10 may be configured such that the projector 6 projects light directly onto the vertical wall 51. The second awning bar 20 may be automatically moved by a control panel, such as a control panel that also controls the awning bar 1.

With reference to FIG. 8, a cross-sectional view of the projector system of FIG. 1 is shown taken along line A-A. When the awning bar 1 is in a first awning bar position, the projector 6 is configured to project light L onto the projector screen 30. The canopy 8 is in an open position, and the projector 6 is arranged below the canopy 8. The canopy 8 shields sunlight, moonlight, light pollution, and other extraneous light, as well as rain, snow, sleet, and other weather elements from interfering with light L projected by the projector 6.

Figure 9:
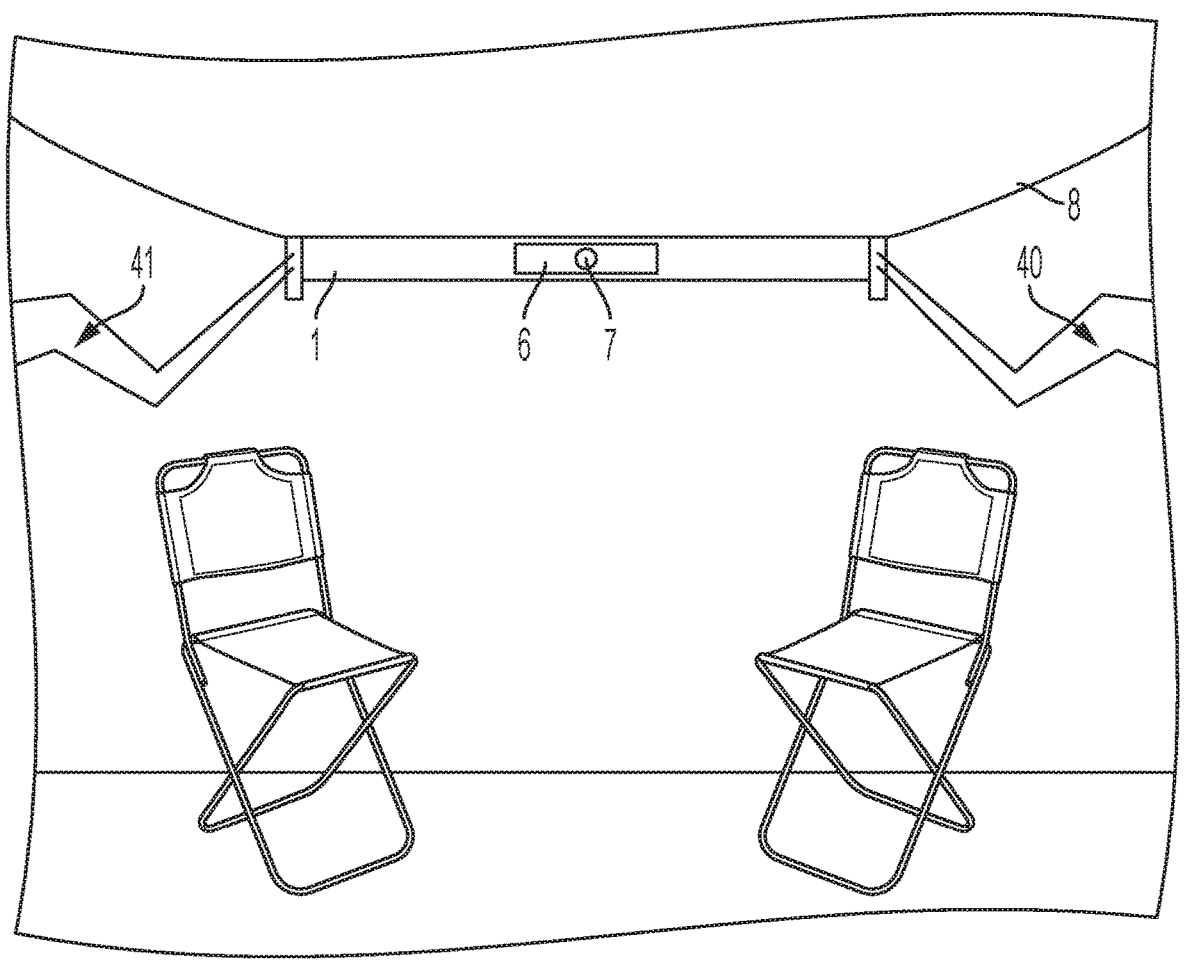
FIG. 9 depicts an environmental view of a projector system according to one embodiment.

With reference to FIG. 9, an environmental view of the projector system is shown according to one embodiment. In this embodiment, the awning bar 1 is in an extended position, and the projector 6 is located within an opening 9 of the awning bar 1. By orienting themselves towards the vertical wall 51 (not shown), one or more users can view images, film, and the like projected onto the projector screen 30 or vertical wall 51 by the projector 6.

Figure 10:
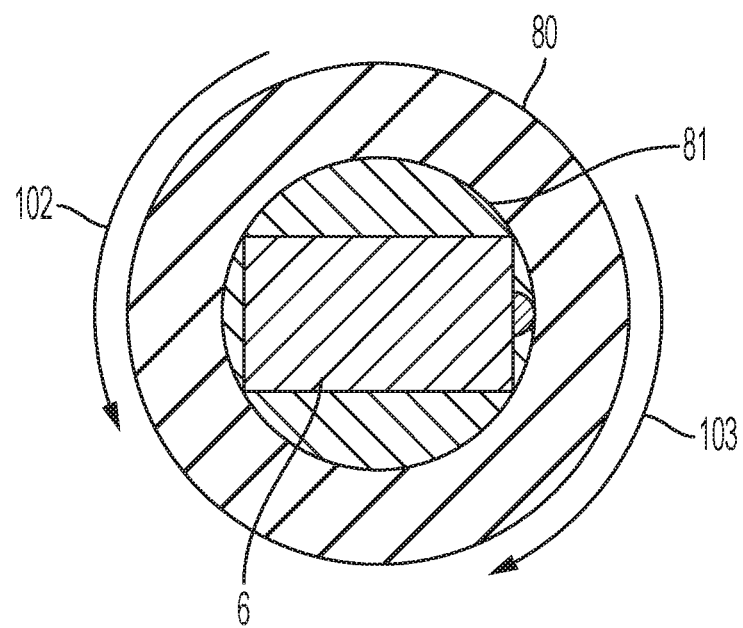
FIG. 10 depicts a cross-sectional view of an awning bar of a projection system according to one embodiment.

With reference to FIG. 10, a cross-sectional view of an awning bar 1 of a projection system 10 according to one embodiment. In this embodiment, the awning bar 1 includes an outer cylinder 80 and an inner cylinder 81 positioned within the outer cylinder. The projector 6 is securably positionable within the inner cylinder, for example, within an opening of the inner cylinder, within a compartment located within the inner cylinder, and the like. The inner cylinder is attachable to at least one movable arm configured to extend the awning bar 1 and retract the awning bar 1, such as first and second movable arm 40, 41. For example, the inner cylinder 81 may be attached to an end of the at least one movable arm such that the inner cylinder is stationary in relation to the end of the movable arm. The outer cylinder 80 is rotatable around the inner cylinder, and may be rotated in direction 102 when the awning bar 1 is being retracted and the canopy 8 is being rolled around the awning bar 1, and may be rotated in direction 103 when the awning bar 1 is being extended and the canopy 8 is unrolling about the awning bar 1 to an open position. In this embodiment, the stationary inner cylinder limits the rotation of the projector 6 during extension and retraction of the awning bar 1. The projector 6 may be configured to operate in a position in which the projecting direction of the projector 6 is parallel with the ground, or within a certain angle of being parallel with the ground, such as −10° to 10°, −45° to 45°, −90 to 90°, or less than −10° or more than 90°. The inner cylinder 81 may be configured to limit the rotation of the projector 6 within the operable angle range of the projector 6. The inner cylinder may be configured to limit the rotation of the projector 6 to less than 180° of rotation, or less than 360° of rotation in relation to the ground. This may preserve the internal components of the projector 6 and increase the longevity of the projector 6 over multiple extensions and retractions of the awning bar 1.

In another embodiment, the awning bar 1 may include speakers. For example, the first end 3 and the second end 4 of the awning bar 1 may include speakers. As an example, speakers may be attached to one or more of the first end and second end. The speakers may be connectable to the projector 6, such as by wiring or Bluetooth® or other wireless connection.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A projector system comprising:
an awning bar including an awning bar body, the awning bar body having a length extending between a first end and a second end; and
a projector including a projection lens, wherein the projector is attachable to the awning bar along the length, wherein the awning bar is configured to attach to a portion of an awning canopy such that the projection lens is located below the awning canopy when the awning canopy is in an open position, wherein the awning bar includes an opening extending between the first end and the second end, wherein the opening includes a compartment configured to contain the projector.

2. The projector system of claim 1, further comprising the awning canopy, wherein the awning bar is extendable away from a vertical wall such that in a first awning bar position the awning bar is extended away from the vertical wall and the canopy is in an open position and extending between the awning bar and vertical wall, and such that in a second awning bar position the awning bar is retracted to the wall and the canopy is in a closed position, and wherein the projector is attachable to the awning bar such that in the first awning bar position the projection is configured to project light onto the vertical wall.

3. The projector system of claim 2, further comprising:
a second awning bar including a second awning bar body having a second length extending between a third end and a fourth end; and
a projector screen,
wherein a second portion of the projector screen is attachable to the second awning bar body along the second length, wherein the second awning bar is attachable to the vertical wall and rotatable such that in a first projector screen position, the projector screen is unrolled from the second awning bar and extends from the second awning bar along the vertical wall such that the projector is configured to project light onto the projector screen when in the second awning bar position, and
wherein in a second projector screen position, the projector screen is rolled around the second awning bar.

4. The projector system of claim 1, wherein the awning bar includes an outer cylinder having the opening and an inner cylinder located within the opening,
wherein the inner cylinder is attachable to an end of at least one arm, wherein the at least one arm is configured to move the awning bar away from a vertical wall and move the awning bar toward the vertical wall such that in a first awning bar position, the awning bar is extended away from the vertical wall and the canopy is in an open position and extending between the awning bar and vertical wall, and such that in a second awning bar position, the awning bar is retracted to the vertical wall and the canopy is in a closed position,
wherein the outer cylinder is rotatable around the inner cylinder such that the canopy is configured to be rolled and unrolled around the awning bar by rotation of the outer cylinder, and
wherein the inner cylinder is stationary with respect to the end of the at least one arm such that an angle of rotation of the projector with respect to the ground is less than 360° when the awning bar moves from the first awning bar position and the second awning bar position and when the awning bar moves from the second awning bar position to the first awning bar position.

5. The projector system of claim 1, wherein the awning bar is a cylindrical tube.

6. The projector system of claim 1, wherein the awning bar includes a door having a hole configured such that in a closed position, the door contains the projector in the compartment and the hole is alignable with the projector lens such that the projector is configured to project light through the hole, and such that in an open position, the projector is removable from the compartment.

7. The projector system of claim 6, within the opening, and wherein the door comprises a portion of a surface of the awning bar body.

8. The projector system of claim 1, wherein the awning bar is a roller tube configured to roll such that the awning canopy is rolled around the awning bar.

9. The projector system of claim 1, further comprising a second awning bar including a second awning bar body having a second length extending between a third end and a fourth end, wherein the second awning bar includes a projector screen, wherein a second portion of the projector screen is attachable to the second awning bar body along the second length.

10. A projector system comprising:
a retractable awning assembly including:
an awning bar including an awning bar body, the awning bar body having a length extending between a first and second end, wherein the awning bar is configured to attach to a portion of an awning canopy; and
at least one arm attachable to the awning bar, wherein the at least one arm is configured to move the awning bar away from a vertical wall and move the awning bar toward the vertical wall such that in a first awning bar position, the awning bar is extended away from the vertical wall and the canopy is in an open position and extending between the awning bar and vertical wall, and such that in a second awning bar position, the awning bar is retracted to the vertical wall and the canopy is in a closed position; and
a projector including a projection lens, wherein the projector is attachable to the awning bar between the first end and the second end such that in the first awning bar position, the projector is configured to project light towards the vertical wall below the awning canopy,
wherein the awning bar includes an opening extending between the first end and the second end, wherein the opening includes a compartment configured to contain the projector.

11. The projector system of claim 10, further comprising a second awning bar including a second awning bar body having a second length extending between a third end and a fourth end, wherein the second awning bar is attachable to the vertical wall; and
a projector screen attachable to the second awning bar body along the second length, wherein the projector screen is configured to extend from the second awning bar along a portion of the vertical wall.

12. The projector system of claim 11, wherein the awning bar is a roller tube having an opening that extends between the first end and the second end, wherein the projector is attachable to the awning bar within the opening, wherein the awning bar is configured to unroll the awning canopy about the awning bar body when the at least one arm moves the awning bar into the first awning bar position, and such that the awning bar rolls the awning canopy about the awning bar body when the at least one arm moves the awning bar into the second position, and wherein the projector is arranged inside the awning bar such that in the first awning bar position, the projection lens points towards a portion of the vertical wall that becomes covered when the projector screen is in a first projector screen position.

13. The projector system of claim 11, wherein the second awning bar is rotatable such that in a first projector screen position, the second awning bar is unrolled and the projector screen extends from the second awning bar along a portion of the vertical wall such that the projector is configured to project light onto the projector screen when the awning bar is in the first awning bar position, and wherein in a second projector screen position, the second awning bar is rolled such that the projector screen is rolled around the second awning bar.

14. The projector system of claim 13, wherein the awning bar and second awning bar are controllable independently of one another such that the awning bar is moveable to the first awning bar position when the projector screen is in the first projector screen position and when the projector screen is in the second projector screen position.

15. The projector system of claim 10, further including a vehicle comprising the vertical wall.

16. The projector system of claim 15, wherein the vehicle is a recreational vehicle.

17. The projector system of claim 10, wherein the compartment includes a door having a hole configured such that in a closed position, the hole is aligned with the projector lens such that the projector is configured to project light through the hole, and such that in an open position, the projector is removable from the awning bar.

18. A projector system comprising:
a recreational vehicle having at least one vertical outer wall;
a retractable awning assembly including:
  an awning bar, including an awning bar body, the awning bar body having a length extending between a first end and a second end, wherein the awning bar is configured to attach to a portion of an awning canopy such that the portion of the awning canopy is attachable to the awning bar body along the first length; and
  at least one arm attachable to the awning bar, wherein the at least one arm is configured to move the awning bar away from the at least one vertical outer wall and move the awning bar toward the at least one vertical outer wall such that in a first awning bar position, the awning bar is extended away from the at least one vertical outer wall and the canopy is in an open position and extending between the awning bar and at least one vertical outer wall, and such that in a second awning bar position, the awning bar is retracted to the at least one vertical outer wall and the canopy is in a closed position; and
a projector including a projection lens, wherein the projector is attachable to the awning bar between the first end and the second end such that in the first, the projection is configured to project light towards the at least one vertical outer wall underneath the awning canopy,
wherein the awning bar includes an opening extending between the first end and the second end, wherein the opening includes a compartment configured to contain the projector.

* * * * *